UNITED STATES PATENT OFFICE 2,395,484

BIS SULPHONAMIDES OF NAPHTHOL SULPHONYL CHLORIDES WITH AROMATIC DIAMINES

Andrew B. Jennings, New Brunswick, N. J., assignor to E. I. du Pont de Nemours & Company, Wilmington, Del., a corporation of Delaware No Drawing. Application April 16, 1943,
Serial No. 483,333

6 Claims. (Cl. 260—556)

This invention relates to dye intermediates or color formers for color photography.

A large number of varied components or dye intermediates that couple with the development product of an aromatic primary amino color coupling developing agents during the development of reducible silver salt have been proposed for photographic processes. They are aptly named color formers and have such a structure or contain such components or groups that they form under conditions of development quinoneimine or azomethine dyes. Immobile or non-diffusing and substantive color formers of the above type which consist of phenol, naphthol, aniline, naphthylamine, aminonaphthol nuclei, and nuclei, of compounds having a reactive methylene group, e. g., acylacetoacetic acid and cyanoacetic acid, esters, and amides, pyrazolones, hydrindenes, and cumarones but which are of sufficient, molecular weight or contain such groups that they are substantive to gelatin or non-diffusing therein have also been proposed for such processes. In fact, sulphonamides of various types have been suggested, including developer and emulsion component types. Many of such color formers have been found to be commercially unsatisfactory because the dye images formed by their use decompose by the action of heat and light. Many have a deleterious effect on light sensitive silver halide grains and desensitize the same. Some reduce the gamma of light sensitive silver halide layers below the utility level. Others, including sulphonamides of 1,5-amino naphthols, desensitize and are not of the proper shade for a blue-green or minus-red color former.

An object of this invention is to provide new and useful color formers. A further object is to provide a new class of naphthol derivatives which are stable to heat and moisture when incorporated in photographic elements. A still further object is to provide such derivatives which are free from deleterious action on light sensitive silver halide grains. A further object is to provide such color formers which form heat- and light-stable dye images upon color coupling development of reducible images. A more specific object is to provide a dye intermediate which forms a blue-green dye of the proper spectral characteristics for 3-color photography.

It has been found that naphthol sulphonamides of the general formula:

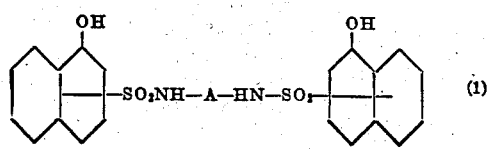

(1)

wherein a position ortho or para to the hydroxyl groups is reactive and A is the divalent radical of an organic diamine of at least eight carbon atoms and having at least one benzene nucleus may be prepared in a practical manner, and are well suited for dye intermediates or color formers in processes of color photography utilizing color coupling procedures in the formation of dyestuff images.

The radical A obviously may vary somewhat and with the imino groups constitute the residue of various aromatic diamines such as 1,5-diamino naphthalene, 2,2'-2,4'- and 4,4'-diaminostilbenes, para diaminodiphenyl ether, benzidine, 1,4-bis (betaaminomethyl) benzene, 1,4-bis (betaaminoethyl) benzene, and the like. The hydrocarbon nuclei of such residues may contain various innocuous radicals or groups which do not enter into dye coupling reactions with diazo compounds or developer components, such as hydrocarbon radicals, ether groups, halogen groups, nitro groups, etc.

Positions ortho or para to the hydroxyl groups may be unsubstituted or may contain a reactive group, e. g., a chlorine or bromine atom or a sulphonic or carboxylic acid group.

The dinaphtholsulphonamides of aromatic diamines described above seem to possess novel, unique, and even surprising properties when they are incorporated into a water permeable colloid layer, such as a gelatin layer of a color yielding photographic element. These properties are evidenced especially in a multilayer photographic element. The compounds have solubility characteristics which distinguish them from the substantive and non-diffusing compounds proposed by prior art investigators. To be more specific, the di (1-naphtrol-2-sulphonamide) of 1,4-diamino-diphenyl ether can be substantially completely removed from a gelatin dispersion containing the compound by washing the same in neutral, aqueous media, yet when the compound is utilized in the blue-green layer of a multilayer film no loss of color separation is obtained when the film is processed in a conventional manner.

Naphtholsulphonyl chlorides which have a reactive position ortho or para to the hydroxyl groups can be utilized for the preparation of the disulphonamides of diamines of Formula 1. The disulphonamides, in general, are prepared by a simple condensation of the naphtholsulphonyl chlorides and diamines in the substantial absence of water, e. g., under anhydrous conditions, or alternatively in aqueous media. A basic agent such as pyridine, trialkylamines, triethanolamine, sodium carbonate, sodium hydroxide, sodium acetate, may be present, if desired. Inert organic solvents, e. g., ether, acetone, acetic acid, dioxane, may be used as reaction media, if desired. However, when the basic agent is also a solvent such agents need not be used.

The naphthol sulphonyl chlorides may be prepared from naphthol sulphonic acids such as the 1,2- and 1,5-isomers. Prior to the preparation of the sulphonyl chlorides, however, the phenolic hydroxyl group should be protected. This may be accomplished by treatment with chloroformic ester or by acylation, e. g., with acetic anhydride, acetyl chloride, etc. The procedure in Monatsh, 53–54 p. 105 (1929) may advantageously be used. The sulphonic acid groups can be converted to sulphonyl chloride groups with phosphorous pentachloride after the hydroxyl groups have been taken care of. The preparation of representative disulphonamides will be outlined further below.

In making color yielding elements in accordance with this invention, the dinapholsulphonamides of aromatic diamines may be brought into solution or fine dispersion with a solvent such as ethyl alcohol or by means of a hydrotropic agent and water and then mixed with an aqueous dispersion of a water permeable or reversible colloid, e. g., gelatin, agar agar, gum arabic, albumin, synthetic gelatin, and other binding agents used in layers for photographic elements, and coated on a film base or support having a substratum suitable for anchoring silver halide layers thereto. The gelatin dispersions may be coated directly onto a light sensitive silver halide layer or stratum or onto a water permeable layer coated on such layer or stratum. In the case of color-yielding elements for contact or imbibition development of the type described in United States Patents 2,328,034 and 2,369,171, the dispersions may be coated directly onto a base or support (1) free from reducible silver salt layers, or (2) in a non-coactive relationship with a reducible silver salt layer of such element, e. g., a "subbed" film base. The dye intermediates also may be admixed with gelatin silver halide emulsions and coated to form single or multilayer photographic elements. Other dye intermediates which form dyes of the proper spectral characteristics for 3-color photography may be used in the other color yielding layers of the elements.

The invention will be further illustrated but is not intended to be limited by the following examples:

*Example I*

A solution of 2 grams of 1,4-diaminodiphenylether and 6.5 parts of 1-carbethoxynaphthol-2-sulphonyl chloride were admixed in 250 cc. of dry ether and refluxed for a period of about 2 hours. Two ccs. of pyridine were added and refluxing was continued for about ½ hour more. Water was then added to the ether solution and the ether was steam distilled off. The viscous semisolid formed was dried and digested with absolute alcohol. On standing the product crystallized and was washed with petroleum ether. Further purification and complete removal of the carbethoxy groups was accomplished by refluxing the product in an aqueous alcoholic solution of potassium hydroxide and reprecipitating with acid. The 4,4'-bis (1-naphthol-2-sulphonamidophenyl) ether obtained is a solid having a melting point of 186° C., having the generic formula:

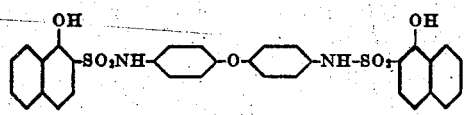

By using one molar equivalent of the 1-carbethoxy naphthol-2-sulphonyl chloride per ½ molar equivalent of diamine and reacting these components in the same manner, the following results were obtained with the amines listed below:

| Amine | Nature of bisulphonamide |
| --- | --- |
| p-Xylylenediamine | Viscous oil. |
| 1,5-naphthylenediamine | Solid. |
| p,p'-Diaminodiphenylmethane | Do. |
| 4,4'-diaminodiphenylmethane-3,3'-dicarboxylic acid | Solid—M. P. 245–248° C. |
| p-Bis-(B-aminoethyl) benzene | Solid. |

*Example II*

1 part of the bisulphonamide of Example I is dissolved in 15 parts of alcohol and added to 50 parts of 2% by weight of aqueous gelatin. The total weight of the combined solution is then admixed with a small amount of water and admixed with 200 parts of a gelatino-silver halide emulsion and the resulting emulsion coated upon a subbed cellulose derivative transparent film base and dried. After exposure to an object field, the photographic element is developed in an alkaline solution of the following composition:

| | |
| --- | --- |
| N-diethyl-p-phenylene diamine hydrochloride___grams__ | 2 |
| Sodium sulphite (anhydrous)_____do___ | 5 |
| Sodium carbonate (anhydrous)_____do___ | 20 |
| Water to_____cc__ | 1000 | whereby a dye image is formed in situ with a metallic silver image. The silver and silver salts are then removed by means of Farmer's reducer and a blue-green dye image of good spectral qualities remain. The image is a very stable indophenol dye. A 48 hour exposure to the carbon arc of a "Fadometer" produces no perceptible change in either shade or intensity. Moreover, 8 weeks' storage at 120° F. and 95% relative humidity produces a barely perceptible change.

When the specific bis-naphtholsulphonamide dyes in the list following Example I are incorporated in a light sensitive silver halide element, exposed and processed in like manner, strong blue-green dye images of good spectral qualities which are stable to heat, moisture, and light are formed in each instance.

While the above examples are limited to the production of a single color element, the invention is obviously not limited to that aspect. On the contrary, the novel bis-naphtholsulphonamides can be used in photographic elements of various structures, including multilayer elements for multi color photography, e. g., mono-packs or bi-packs. The following examples are directed to novel color yielding elements and processes of photography utilizing the compounds.

*Example III*

A photographic silver halide emulsion containing 4,4'-bis-(1-naphthol-2-sulphonamidophenyl) ether prepared after the manner stated in Example II is coated onto a transparent cellulose acetate film base. A layer of colloidal silver in gelatin is deposited on to the opposite side of the film base. On the latter is coated a photographic silver halide emulsion containing diacetamino-1,2,4,5-benzo bis thiazole as an orange-red color former. The element can then be used for the production of two-color prints in the following manner.

The side containing the color former of Example I is exposed to a negative record of the red aspects of a colored object, and the side containing the orange-red color former is exposed to a negative record of the green aspects of the same colored object. The element is then developed for 15 minutes in a bath of the following composition:

| | |
|---|---:|
| N-diethyl-p-phenylene diamine hydrochloride _____grams__ | 3 |
| Sodium carbonate (anhydrous) _____do____ | 30 |
| Sodium sulphite (anhydrous) _____do____ | 1 |
| Potassium bromide _____do____ | .25 |
| Water to_____cc__ | 1000 | whereby dye images are formed simultaneously in the two light-sensitive layers. After washing and treatment with Farmer's reducer, a colored representation of the original object remains.

*Example IV*

An element for 3-color prints or transparencies can be made by depositing on a cellulose acetate film base a positive type non-color-sensitized silver halide emulsion, which contains as a yellow color former N-furoylacet-N'-benzoylacetbenzidine. The preparation of this compound is given in United States Patent No. 2,319,426. On the opposite side of the base is deposited a panchromatic silver halide emulsion containing as a color former the 4,4'-bis-(1-naphthol-2-sulphonamidophenyl) ether. A gelatin layer containing a yellow filter dye, e. g., tartrazine, is coated on the latter layer. On this is coated a blue sensitive silver halide emulsion containing 4,4'-methylene-bis-(m-stearoylaminophenyl methyl pyrazolone) which is described in U. S. P. 2,294,909. This element can be used for the production of three-color prints as follows:

The light-sensitive layer containing 4,4'-methylene-bis-(m-stearoylaminophenyl methyl pyrazolone) is exposed with blue light to a negative record of the green aspects of a colored subject and on the same side of the support is printed with red light the red component negative record of the subject. The light-sensitive layer on the opposite side of the support is exposed with blue light to the blue component negative record of the subject. The element is processed by the procedure of Example III, whereupon a colored reproduction of the original subject is obtained.

*Example V*

An element somewhat similar to that of Example IV can be made by placing the color formers in a separate gelatin layer rather than in the respective silver halide emulsion layers. Such a film element may comprise in order a film base, a gelatin layer containing the di-(1-naphthol-2-sulphonamide) of 1,4-diaminodiphenyl ether, a red-sensitive silver halide gelatin layer, a gelatin layer containing 4,4'-bis-(1-naphthol-2-sulphonamidophenyl) ether, a gelatin layer containing 4,4'-methylene - bis - (m-stearoylaminophenyl methyl pyrazolone as a color former, a green-sensitive silver halide gelatin layer, a gelatin layer containing tartrazine as a yellow filter dye, a gelatin layer containing N-furoylacet-N'-benzoylacetbenzidine, and finally a blue sensitive gelatin silver halide layer. This may be exposed to an original color scene and processed as follows:

The exposed element is developed for 15 minutes in the following bath:

| | |
|---|---:|
| Hydroquinone _____grams__ | 8 |
| Metol _____do____ | 2 |
| Sodium carbonate (anhydrous) _____do____ | 60 |
| Sodium sulphite (anhydrous) _____do____ | 40 |
| Potassium bromide _____do____ | 3.5 |
| Potassium thiocyanate_____do____ | 2.0 |
| Water to _____cc__ | 1000 |

After washing for 10 minutes, the element is exposed to white light and then developed for 25 minutes in the following bath:

| | |
|---|---:|
| N,N-diethyl - p - phenylene diamine hydrochloride _____grams__ | 3 |
| Sodium carbonate (anhydrous) _____do____ | 30 |
| Water to _____cc__ | 1000 |

Following washing and removal of silver with Farmer's reducer, a positive color reproduction of the original scene is obtained.

The novel bis-naphthol-sulphonamides of aromatic diamines may contain in the benzene nuclei any of the common substituents which give desirable properties to dyes. Such substituents include hydroxyl, amino (—NH₂), hydrocarbon substituted amino, halogen, alkoxyl, hydrocarbon, e. g., alkyl, aryl, and aralkyl; carboxyl, nitrile, sulphonic, sulphone, sulphinic sulphide, nitro, etc.

The bis-naphthol sulphonamides of aromatic diamines may be dispersed in gelatin or equivalent water permeable reversible colloid bonding agents, e. g., albumin, agar-agar-, polyglucuronic acid, etc.; or they may be admixed with resins or cellulose derivatives and dispersed in such colloid layers containing light sensitive materials or coated on light sensitive silver salt layers.

The color yielding elements may contain light sensitive layers composed of simple or mixed silver halides which may contain the usual sensitizers, desensitizers, stabilizers, fog inhibitors, emulsion hardeners, etc. Suitable types include silver chloride, silver bromide, silver choloro-bromide, silver chloride-bromide-iodide, silver bromide-iodide, etc., which may contain cyanine, carbocyanine, polymethine, cyanine, cyazine, carbo-cyazine, pseudocyanine, kryptocyanine, merocyanine, rhodanine, etc., salts and bases. The silver halide layers are anchored to the supports by means of the usual subbing solutions. Such solutions are also useful for anchoring dye component layers to bases.

The products of this invention are not limited in their utility to any one process of color photography. They may be used with other color coupling developing agents than those specifically described in the examples. The diamino aryl compounds such as para-phenylene-diamine and its substitution products are preferred. These developers may be substituted in the amino groups as well as in the ring, preferably the former, to constitute compounds such as the mono- and di-alkyl arylene-diamines, including the mono- and di-alkyl naphthylenediamines, alkyl phenylenediamines and alkyl toluylenediamines. The compounds, of course, must have one free primary or unsubstituted amino group which enables the oxidation product of the developer to couple with the color forming compounds. As examples of developers of the class described, there may be mentioned p-amino-diethylaniline, 1,4-naphthylenediamine, 4-diethylamino-1-naphthylamine. The salts of the bases which may be organic or inorganic are, in general, more soluble and more stable than the free bases. The hydrochlorides and sulphates have great utility in preparing the developing solutions. Hydrazines as set forth in U. S. P. 2,209,929 may also be used according to the process of United States Patent No. 2,339,213.

The bi-naphtholsulphonamides of Formula 1 are believed to be new compounds. Their use in photographic processes, as stated above, leads to superior, unique, and unexpected results. The spectral quality of quinoneimine dyes produced by color coupling development of two representative dyes shown in the spectro photometric curves evidence their superior properties.

The compounds seem unique in that they may be used in multilayer films without loss of color separation but they can be washed from a gelatin dispersion by washing in neutral aqueous media. This indicates they are not substantive or non-diffusing in the ordinary sense.

The blue-green or minus red characteristics of the dyes formed upon color development of images with the color formers of this invention shown in the curves evidences that they are well suited for processes of multi-color photography.

In addition to their outstanding spectral qualities of the dye images produced in color development procedures, the compounds have excellent stability to heat and light. A further advantage resides in the fact that the color formers do not desensitize silver halide emulsions and reduce gamma below the utility level. The color formers, moreover, seem to increase the relative sensitivity of emulsions exposed to white and blue light, whereas previously proposed sulphonamides of aminonaphthols desensitize such emulsions.

As many apparently widely different embodiments of this invention may be made without departing from the spirit and scope thereof, it is to be understood that the invention is not to be limited except as defined in the appended claims.

I claim:

1. The new compounds of the formula:

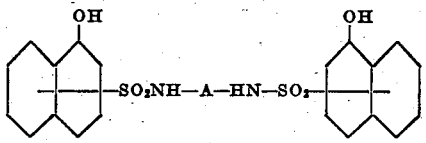

wherein a position ortho or para to the hydroxyl groups of the naphthol nuclei contains a reactive group taken from the group consisting of a hydrogen atom, a halogen atom, a sulphonic acid and a carboxylic acid group and A is the divalent radical of an organic diamine of at least 8 carbon atoms and having at least one benzene nucleus.

2. The new compound 4,4'-bis-(1-naphthol-2-sulphonamidophenyl) ether.

3. The process which comprises condensing 1-carbethoxy-naphtholsulphonyl chloride-2 with a diamine of the general formula $NH_2$—A—$NH_2$ wherein A is the divalent radical of an organic diamine of at least 8 carbon atoms and having at least one benzene nucleus.

4. The process which comprises condensing 1-carbethoxy-naphtholsulphonyl chloride-2, with 4,4'-bis-(aminophenyl) ether.

5. A dyestuff of the formula:

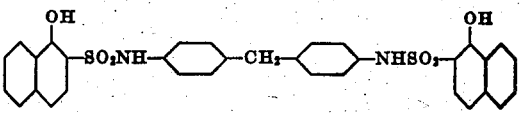

6. A dyestuff of the formula:

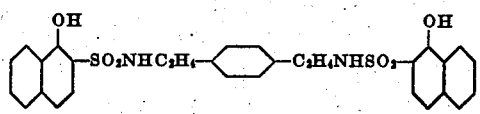

ANDREW B. JENNINGS.

Disclaimer 2,395,484.—*Andrew B. Jennings*, New Brunswick, N. J. BIS SULPHONAMIDES OF NAPHTHOL SULPHONYL CHLORIDES WITH AROMATIC DIAMINES. Patent dated Feb. 26, 1946. Disclaimer filed Dec. 30, 1947, by the inventor; the assignee, *E. I. du Pont de Nemours and Company*, assenting.

Hereby disclaims claim 1, except those compounds more specifically covered by claims 2, 5, and 6 of said patent.

[*Official Gazette January 27, 1948.*]